April 15, 1969   KIMIO HATASHITA   3,438,709
PHOTOGRAPHIC DARKROOM APPARATUS
Filed Oct. 10, 1966
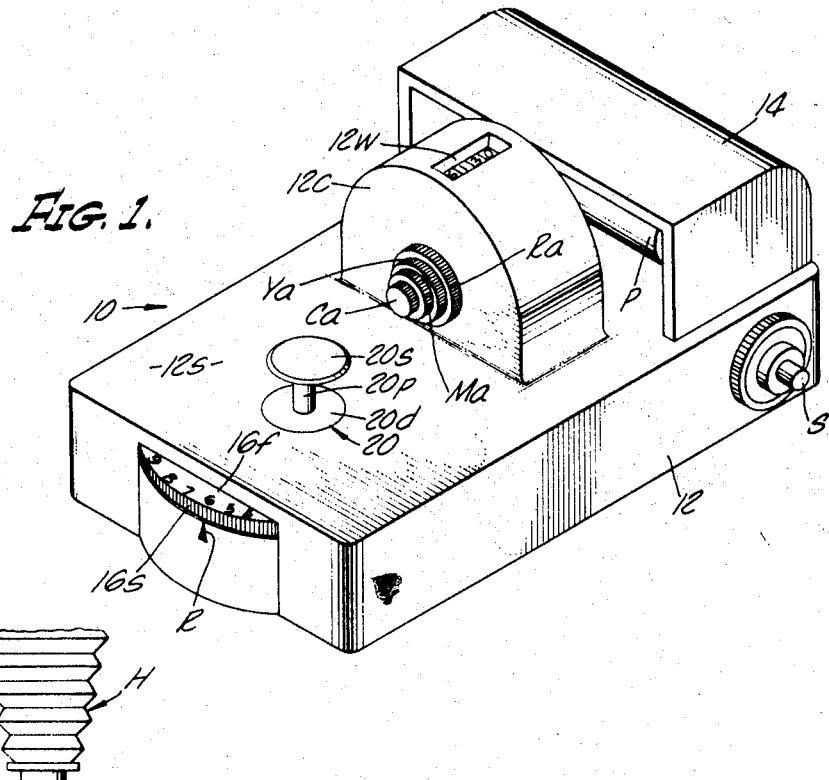
FIG. 1.
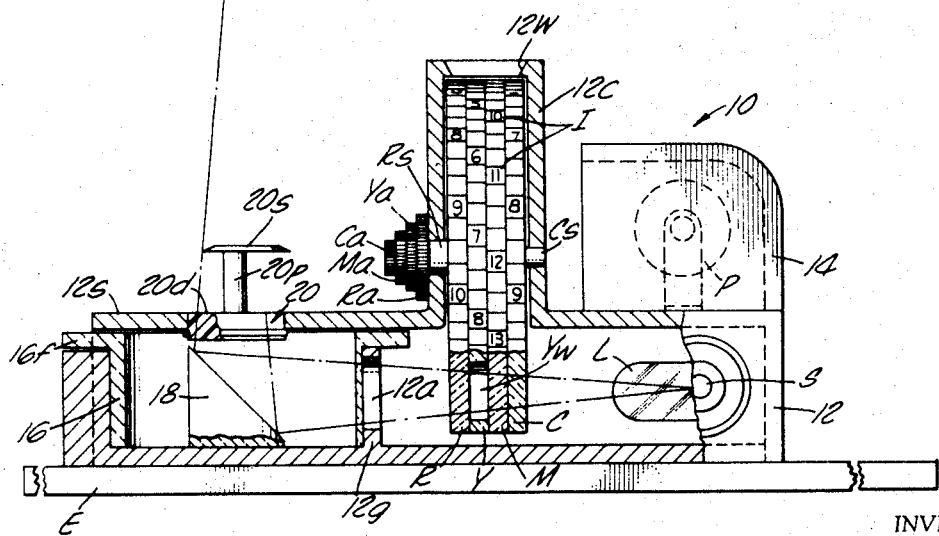
FIG. 2.
INVENTOR.
KIMIO HATASHITA
BY
ATTORNEYS

United States Patent Office 3,438,709
Patented Apr. 15, 1969

3,438,709
PHOTOGRAPHIC DARKROOM APPARATUS
Kimio Hatashita, Gardena, Calif., assignor to Rocker Solenoid Company, Wilmington, Calif., a corporation of California
Filed Oct. 10, 1966, Ser. No. 585,571
Int. Cl. G03b 27/76
U.S. Cl. 355—35                                7 Claims This invention pertains to photographic darkroom apparatus and more particularly to apparatus useful for facilitating photoprinting and photoenlarging in both black and white and in color. Still more specifically, the invention is directed to means for enabling a photo-technician to select in advance an optimum combination of exposure time and illumination intensity in the case of black and white printing and enlarging, and a desired color-filter combination when making color prints and enlargements for each different grade and type of paper.

Briefly, the invention comprehends means or apparatus whereby the intensity of illumination in the exposure or print plane, as at the easel of an enlarger, and the color tone of the illumination as well, in the case of color work, may be brought to predetermined intensity and color levels for exposures of predetermined time periods for optimum results in the finished photoprint or enlargement. The apparatus comprises a flat white surface interrupted over a selected area by a diffuse translucent coplanar surface, means to variably illuminate the translucent surface with either white light or light of selected and variable color composition and of selected variable intensity, means for indicating the intensity and color composition of the illumination provided for the translucent surface, enlarger means for illuminating the flat white surface with either white light or light of a selected color composition, and means for shielding the translucent surface from illumination by the means illuminating the flat white surface.

Thus the invention provides means whereby when a desired optimum combination of exposure time and illumination intensity for either white and black or color has been determined by experiment or trial for each of different types and grades of paper and types of negatives, the same optimum combination can be re-established at will at any time by manipulation of adjustable means comprised in the apparatus. Alternatively and advantageously, the apparatus components are maintained in a preadjusted position known to provide a satisfactory print and the intensity of the enlarger light is varied to match that provided by the apparatus.

For example, in the case of producing an enlarged color print from a color negative, a desired optimum combination of color and intensity of illumination for the general type of negative is arrived at by selection of color filters, inserting the filters in the enlarger, placing a typical negative of the noted type in the enlarger head, adjusting the aperture and exposure time and making a series of prints, and judiciously varying one or more of the variable factors between successive prints until the optimum combination has been determined. Thereafter, a record is made of the black and white or color negative, the aperture, exposure time, color filter combination employed, and paper grade and type. Thus a catalog of combinations is produced, to which reference may be made for selections, for any subject negative received for use, of paper grade and type, exposure time, filter combination, etc. The means provided by the invention permit, in the case of any such negative received, rapid and easily adjusted comparison means for arriving at the noted desired results.

The preceding brief description of the invention makes it evident that it is a principal object of the invention to provide improvements in photographic darkroom apparatus.

Another object of the invention is to provide means for facilitating photographic printing and enlarging operations.

These and other more specific objects will appear upon reading the following specification and claims and upon considering in connection therewith the attached drawing to which they relate.

Referring now to the drawing in which a preferred embodiment of the invention is illustrated.

FIGURE 1 is a pictorial view of the exemplary apparatus according to the invention, as adapted for use with a photographic enlarger; and FIGURE 2 is a partly diagrammatic, partly sectional view, illustrating in section the exemplary apparatus shown pictorially in FIGURE 1, and the relationship of the apparatus to elements of a photographic enlarger.

Referring to the drawings, there is illustrated exemplary apparatus, designated generally 10, comprising a shell-like housing 12 having an attached hood 14 enclosing suitable power means. The housing is provided with a cupola 12c having a porthole or window 12w. The housing is formed to provide an extensive substantially flat or planar surface 12s which is coated or otherwise arranged to provide a flat white surface upon which a projected image may be formed.

Arranged for rotation in housing 12 is a variable-density optical wedge 16 (FIGURE 2). The latter conveniently may be formed with an annular flange 16f and arranged to rotate within an apertured guide 12g that is formed as an upstanding curved wall-like portion of housing 12. The guide 12g is provided with an aperture or window 12a for admission of light to the optical wedge 16. A light source such as an electric incandescent lamp L and a switch S therefor, are disposed on and in the housing as indicated, to supply a beam of light directed through the window 12a as shown. The beam of light is reflected by a prism 18 to pass upwardly and illuminate a translucent member 20. Member 20 is rotatably mounted in a complementary bore formed in the flat upper wall of housing 12, and is provided with a diffusing upper surface 20d as by sanding.

Affixed to member 20 for rotation therewith is a post 20p on the upper end of which is an eccentrically mounted circular opaque shield 20s having, preferably, black, light-absorbing, non-reflective, upper and lower surfaces. Thus, with lamp L lighted, the lower surface of translucent member is illuminated, and the upper sandblasted surface of the member provides diffused illumination whose intensity may be adjusted by rotation of the variable-density optical wedge 16. The housing 12 is provided with a smooth lower surface and is adapted to be moved to and fro over the paper-receiving surface of an easel E of an enlarger whose adjustable head H is indicated only diagrammatically and in part.

The arrangement and construction of the previously noted components is such that when the aperture of the enlarger is adjusted and head H is adjusted in position for projection of an image of a particular negative to the desired scale on easel E, and a properly exposed print having the desired tonal value has been made with a recorded exposure time as previously detailed, the housing 12 is placed on the easel, the enlarger turned on and the housing is shifted so that a selected neutral density portion of the negative-image appears on flat white surface 12s adjacent and overlapping on surface 20d. With the enlarger adjustment remaining as previously set for exposure of the developed print, lamp L is turned on, and shield 20s is rotated to cast a shadow whose edge coincides with the boundary of the diffused light field of surface 20d and the adjacent image of selected tonal value on surface 12s. Then optical wedge 16 is rotated until the intensity of the diffused light at surface 20d matches that of the adjacent selected portion of the image formed on flat white surface 12s. A record is made of the indication of the setting of the optical wedge 16 furnished by scale divisions 16s on rim or flange 16f relative to a ledger mark R provided on the end wall of the housing (FIGURE 1).

It is evident that with a set of records of readings of the apparatus reative to type and grade of paper and exposure time and different general types of negatives, proper enlarger aperture and exposure time for any enlargement to be made from a new negative received may be determined by placing the negative in the enlarger, projecting an image onto the easel, selecting a neutral tonal area of the image, moving the apparatus into position with the edge of member 20 in the selected area, activating lamp L, adjusting shield 20s and optical wedge 16 to bring the illumination intensities into balance, reading the optical wedge scale 16s, and consulting the record corresponding to the type and grade of paper and the type of negative, and then setting the enlarger aperture and timing the exposure in accord with the recorded values of the latter variables. Thus experimentation, or estimation of proper aperture and exposure time for any incoming negative are obviated; and optimum results are quickly and easily obtained.

In the case of color film and color print work, the previously explained procedures are followed and appropriate records made for reference, with the additions necessary for accommodating color tone as well as illumination intensity, utilizing color means in the form of a bank or set of selected color filters in the light source or box of the enlarger head, and a corresponding set of adjustable light filter means in the noted apparatus. To that end there is provided in the apparatus a set of variable-density color filter wheels, such as C, M, Y and R (FIGURE 2), the colors being, for example, cyan, magenta, yellow and red, and the wheels being individually adjustable, and each including a transparent section or an open window for selectively passing light without effecting color modification. Wheel R is mounted on a stub sleeve Rs to the end of which is affixed an adjusting knob Ra. Wheel Y is mounted on a similar but longer stub sleeve on which stub sleeve Rs is rotatable, and to which longer sleeve an adjusting knob Ya is affixed. Wheel M is similarly arranged for rotation by means of a sleeve and knob Ma, its sleeve supporting that of wheel Y and in turn being supported on and by a shaft Cs which is journaled at one end in a bearing bore in cupola 12c. Shaft Cs has affixed thereto the filter wheel C, and at its exterior end is affixed to a knob Ca. Each of the wheels is, or comprises, a variable-density color filter the color density of which varies from a zero value at the transparent portion or window (such as window Yw in wheel Y) to maximum density, by steps. For example, the wheels may be made of, or contain, sectors of progressively increasing color density, or may comprise, as inserts, circular filter discs which may be carried in windows formed in the wheels.

The color wheels are thus rotatable. Further, they are provided with indicia, such as numbers as shown, applied to their respective rims. The indicia are visible, one at a time on each wheel, through cupola window 12w (see FIGURE 1) whereby a record may be derived and made of the setting of each wheel in any adjustment configuration. As indicated, the set of filter sectors or discs of each wheel is matched by a corresponding set of filter slides for use with the enlarger light source. Thus not only desired intensity of light, but color tone and color combination as well can be recorded, relative to exposure time, film and paper types, and enlarger aperture, whereby for any selected type and grade of color print paper and any received type of color negative the enlarger may readily be brought into condition for obtaining optimum results by first using the apparatus of the invention, reading the indicators, consulting the records and setting the filters and aperture of the enlarger as indicated by the records, and exposing for the time indicated. Thus much cut-and-try work is obviated in producing color prints or enlargements of optimum quality once a catalog record has been made.

In the apparatus, various arrangements may be made for furnishing power to lamp L. In the preferred embodiment, provision is made for supporting an easily replaced electric battery or cell P (FIGURE 1) in a set of terminal clips which communicate electrically with switch S and lamp L, the entire group of power means being housed within hood 14 as indicated. Further, as is evident, the housing may be formed of several parts and be held together by any of several means known in the art, e.g., by snap interconnections, fasteners or adhesive.

The previous explanation of a preferred exemplary embodiment of apparatus according to the invention makes it evident that the aforementioned objects have been fully attained. In the light of the disclosure changes and modifications within the true spirit and scope of the invention will occur to those skilled in the art and it is accordingly not desired that the scope of the invention be limited except as it is restricted by the appended claims.

I claim:
1. Photographic darkroom apparatus comprising:
   first means, including surface forming means, providing a flat white surface;
   second means, including a translucent member having a light diffusing surface having a boundary substantially coextensive with a boundary of said flat white surface;
   third means, including light-source means and means for directing light from said source means through said translucent member to said diffusing surface, said third means being adjustable to vary the intensity of light diffused by said diffusing surface; and
   fourth means, including opaque means arranged to provide along said boundary a coincident boundary of a shadow produced thereby from image-producing light projected toward said flat white surface and said diffusing surface,
   whereby by adjustment of said third means said coincident boundary may be made to be substantially extinct.

2. Photographic darkroom apparatus according to claim 1, in which said third means includes variable-density optical wedge means interposed between said light source means and said diffusing surface and movable to different positions to intercept and absorb respectively different amounts of the light directed to said diffusing surface, and indicator means for indicating the position of said wedge means.

3. Photographic darkroom apparatus according to claim 1, in which said third means includes a set of adjustable variable-density color filter means, whereby by adjustment of said color filter means said coincident boundary may be made to become substantially extinct when image-forming light projected onto said flat white surface at said boundary of a said shadow is not white light.

4. Photographic darkroom apparatus according to claim 3, in which said set of adjustable variable-density color filter means has associated therewith means for providing a recordable indication of the extent of adjustment of each of the set of said color filter means.

5. Photographic darkroom apparatus comprising:
   first means, including housing means, and said first means providing an extensive flat white surface adapted to receive image-forming light;
   second means, including translucent means having a light diffusing surface interrupting said flat white surface along a prescribed boundary, and indicia-bearing variable means for variably illuminating said diffusing surface via said translucent means;

third means, including opaque means to cast a shadow having a boundary defined by presence and absence of image-forming light and said third means being movable to bring into coincidence at least a portion of the extents of said prescribed boundary and the said boundary of said shadow;

whereby, when image-forming light is projected on said flat white surface and said opaque means is moved to bring said prescribed boundary and said boundary of said shadow into coincidence along a portion thereof, and said variable means is varied to render said portion of said boundary visually indistinct, said indicia provide a recordable indication of the intensity of said shadow at said portion of said boundary.

6. Photographic darkroom apparatus according to claim 5, in which said variable means comprises adjustable color-filter means and a light source directing light through said filter means to said diffusing surface, whereby when colored image-forming light is projected on said flat white surface, said variable means may be varied to match both the color tone and the intensity of illumination of said diffusing surface at said portion of said boundary to that of the image-forming light on said flat white surface at said portion of said boundary.

7. Photographic darkroom apparatus according to claim 6, including indicating means associated with said color-filter means for providing a recordable indication of the extent of variation of said color-filter means necessary to match the color tone of said image-forming light at said portion of said boundary.

References Cited

UNITED STATES PATENTS 3,187,652   6/1965   Kinnard _____ 88—24 X

NORTON ANSHER, *Primary Examiner.*

RICHARD A. WINTERCORN, *Assistant Examiner.*

U.S. Cl. X.R.

95—10